US005100602A

United States Patent [19]

Day et al.

[11] Patent Number: 5,100,602

[45] Date of Patent: Mar. 31, 1992

[54] METHOD AND APPARATUS FOR POWDER FILLING AN ISOSTATIC PRESSING MOLD

[75] Inventors: James Day, Scotia; Bernard P. Bewlay, Schenectady, both of N.Y.

[73] Assignee: General Electric Company, Schenectady, N.Y.

[21] Appl. No.: 646,113

[22] Filed: Jan. 28, 1991

[51] Int. Cl.[5] .......... B29C 43/02

[52] U.S. Cl. .......... 264/115; 264/109; 264/120; 419/66; 419/68; 425/405.2; 425/418; 425/457; 425/469

[58] Field of Search .......... 264/69, 109, 115, 120, 264/123; 425/77, 405.1, 405.2, 418, 421, 431, 456, 457, 469; 419/66, 68

[56] References Cited

U.S. PATENT DOCUMENTS

| | | | |
|---|---|---|---|
| 4,123,216 | 10/1978 | Leibrock | 425/431 |
| 4,390,488 | 6/1983 | Wessel | 419/66 |
| 4,407,648 | 10/1983 | Fosse | 425/457 |
| 4,690,791 | 9/1987 | Edmiston | 264/122 |

*Primary Examiner*—Mary Lynn Theisen

*Attorney, Agent, or Firm*—James E. McGinness; James C. Davis, Jr.; James Magee

[57] ABSTRACT

A method and apparatus for filling generally cylindrical molds with powder particles is disclosed. A stream of powder particles is fed into a mold, and the powder particles are compacted in spirally formed layers so that the particles are compacted continuously in localized adjacent areas. The powder filling apparatus is comprised of a blade means configured to direct powder particles to spread evenly in the mold and urge the powder particles to compact while the blade means is rotated about an axis. A shaft is attached to the blade means for rotation of the blade means about the axis. A chuck means is slideably mounted on the shaft means through an axial channel, the chuck means being configured for applying force to the shaft while permitting movement of the shaft axially through the channel. A drive means is operatively connected to the chuck means for applying force to rotate the chuck about the axis. The powder particles are filled to a high and uniform fill density by the powder filling method and apparatus of this invention.

6 Claims, 1 Drawing Sheet

METHOD AND APPARATUS FOR POWDER FILLING AN ISOSTATIC PRESSING MOLD

This invention relates to powder filling of molds, and in particular to the filling of generally cylindrical molds having a high length to diameter ratio to a high and uniform powder density.

BACKGROUND OF THE INVENTION

Cold isostatic pressing is described, for example in "Isostatic Pressing Technology", edited by P. J. James, Applied Science Publishers Ltd., New York, 1983, pp. 91-161, incorporated herein by reference. Cold isostatic pressing is the compaction of powders by pressing at low or ambient temperatures. A compact is formed having a green strength due to the mechanical interlocking of the powder particles. Some of the products made by cold isostatic pressing include spark plug insulators, china, and solid fuel rods. The pressed or green compact can be sintered by high temperature heating to achieve higher density and improved mechanical strength. Two of the well known cold isostatic pressing methods and the tooling associated therewith are known as the wet bag cold isostatic press and the dry bag cold isostatic press. The method and apparatus of this invention are useful in the powder filling of molds, for example, the molds used in hot isostatic pressing, dry bag cold isostatic pressing, and wet bag cold isostatic pressing.

In dry bag cold isostatic pressing, sometimes herein referred to as dry bag pressing, an elastomeric bag or mold is fixed within a pressure vessel. The elastomeric mold has at least one open end which is sealed with the pressure vessel so that the fluid pressure medium within the vessel cannot enter the mold interior. The elastomeric mold is made from a material which does not chemically react with either the powder or the pressure medium, and readily releases from the green compact after pressing. For example, a cylindrical elastomeric mold having a high length to diameter ratio is open at both ends, and has a cylindrical void space therein. Sealing means for the open mold ends are provided by wear resistant metal punches. The punches are located and restrained by the yolk of the press, and guided into the bag by wear resistant bushes mounted in the pressure vessel. The top punch is removed and powder is charged into the void space in the mold by completely filling the void space between the sealing means. The powder filling method of this invention is primarily for use in filling generally cylindrical molds having a uniform cross-section, and is particularly useful in filling such molds when used in dry bag or wet bag cold isostatic pressing.

An important step prior to cold isostatic pressing is powder filling of the mold cavity, preferably to a uniform fill density from top to bottom. The uniformity of powder density in the filled mold translates into dimensional uniformity of the pressed compact. When the powder does not have a uniform fill density various non-uniformities and defects can be found in the pressed compacts. In some methods, powder is spray dried with a binder before filling to create agglomerates that will improve flowability. However, such binders can be difficult to remove and remain as undesirable contaminants in the pressed compact. As used herein, the term "fill density" means the density of powder in the mold prior to compaction.

In the case of tungsten powder or other fine powder that does not freely flow, and where a binder is undesirable, cold isostatic pressing molds having a high length to diameter ratio are difficult to fill to a uniform powder density. For example, the free fall of a high density powder, such as tungsten, to the bottom of the mold can result in a higher packing at the bottom of the mold, whereas the top of the mold has a loose packing. After cold isostatic pressing, the variation in fill density produces compacted parts with a slightly conic profile where the bottom has a larger diameter. Uniform powder filling also minimizes necking in the pressed compact, usually caused by underfill or powder settlement prior to cold isostatic pressing.

An important parameter in the design and operation of the isostatic press and mold is the "compaction ratio" of the powder. The compaction ratio is the ratio between the initial density of the powder in the mold, and the density of the compact after isostatic pressing. The rigid punches that seal the elastomeric molds do not deform during isostatic pressing, and as a result a flare forms in the compact at the interface where the powder meets the sealing punches. The flare, known as elephant's foot, is directly proportional to the compaction ratio of the powder. A high powder fill density lowers the compaction ratio, and therefore reduces such flaring of the compact ends adjacent sealing punches in the mold.

Avoidance of non-uniformities and defects in pressed compacts is of greater importance in compacts subjected to additional processing, such as tungsten compacts that are sintered and wire drawn to form the filament wire in incandescent light bulbs, or molybdenum compacts that are sintered and wire drawn to form wire leads and supports in incandescent light bulbs. For example, such non-uniformities and defects in pressed compacts as described above can cause failure during wire drawing, or premature failure of the drawn filament in use as an incandescent light.

Another problem to be avoided in powder filling cold isostatic pressing molds, especially with finer powder of 2 microns or less, is the entrapment of excessive amounts of air which can be trapped between powder particles during filling. During compaction of the powder in the cold isostatic press, the entrapped air remains distributed throughout the compact in the form of small voids or high pressure pockets of air. After the cold isostatic pressing is completed the mold and compact must be decompressed. During decompression of the mold, the entrapped air pockets can apply non-uniform forces to the compact and result in breakage or damage to the compact.

It is an object of this invention to provide a method and apparatus for powder filling generally cylindrical molds having a uniform cross-section to have a uniform fill density.

It is another object of this invention to provide a method and apparatus for powder filling generally cylindrical molds having a uniform cross-section to have a high fill density that minimizes non-uniformities and defects in compacts pressed in the molds.

It is another object of this invention to provide a method and apparatus for powder filling generally cylindrical molds having a uniform cross-section and a high length to diameter ratio to have a uniform and high fill density that minimizes non-uniformities and defects in compacts pressed in the molds.

It is another object of this invention to provide a method and apparatus for powder filling cold isostatic pressing molds to have a uniform and high fill density that minimizes non-uniformities and defects in compacts pressed in the molds.

BRIEF DESCRIPTION OF THE INVENTION

Cylindrical molds of uniform cross-section can be filled with powder particles to a high and uniform fill density by the powder filling method and apparatus of this invention. The promotion of high and uniform fill densities in cylindrical molds, especially molds having a high length to diameter ratio, improves dimensional uniformity in the resulting cold isostatic pressed compact. As a result, defects are minimized and uniformity is improved in pressed compacts when cold isostatic press molds are filled by the method and apparatus of this invention.

In the method of this invention, cylindrical molds of uniform cross-section are filled with powder particles by feeding a stream of the powder particles into the mold, and compacting the particles in spirally formed layers so that the particles are compacted continuously in localized adjacent areas. Preferably, agglomerations in the powder are dispersed prior to the step of compacting the particles.

The apparatus of this invention is comprised of a blade means configured to direct powder particles to spread evenly in the mold and urge the powder particles to compact while the blade means is rotated about an axis. A shaft attached to the blade means for rotation of the blade means about the axis has bearing surfaces for acceptance of force applied to the shaft. A chuck means is slideably mounted on the shaft means through an axial channel, the chuck means being configured for applying force to the bearing surfaces on the shaft while permitting movement of the shaft axially through the channel. A drive means is operatively connected to the chuck means for applying force to rotate the chuck about the axis. Optionally, a load means is attached to the shaft to apply additional force for urging the blade means to compact powder below the blade means. Preferably, a dispersing means is attached to the shaft at a location spaced from the blade means for dispersing particle agglomerations while being rotated by the shaft, before the particle agglomerations come into contact with the blade means.

BRIEF DESCRIPTION OF THE DRAWING

The following detailed description of the invention makes reference to the following drawing in which.

DETAILED DESCRIPTION OF THE INVENTION

Figure 1:
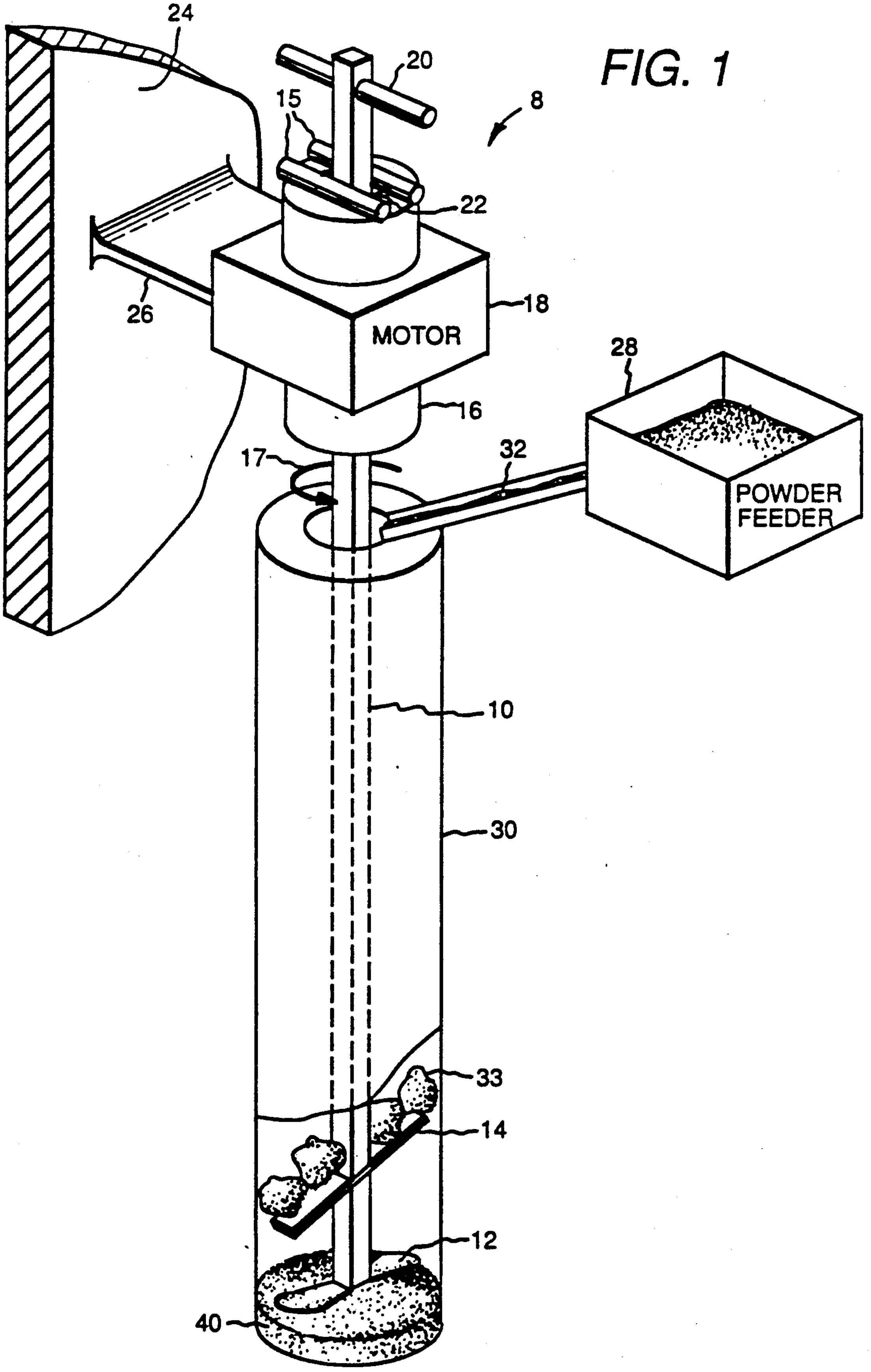
FIG. 1 is a partial cross-section of an isometric view of an apparatus according to this invention.

Referring to FIG. 1, a powder filling apparatus 8 is shown as comprised of square shaft 10, blade 12, dispersing bar 14, chuck 16, motor 18, and weight 20. The sides of square shaft 10 form bearing surfaces for transmittal of rotating force to the shaft. Blade 12 is fixedly attached to one end of square shaft 10 by fasteners, welding, or other suitable attachment. Blade 12 is fixedly attached to shaft 10 so that the blade rotates about a central axis, i.e., the central axis of cylindrical mold 30. Blade 12 is configured as a low pitched two blade propeller suitable for evenly spreading powder descending on the blade and urging the powder to compact below the blade. Blade 12 can be formed to have fewer blades, i.e., one blade, or more blades, i.e., three or more blades having a pitch up to about 25 degrees. Shaft 10 and blade 12 are preferably made of a hardened wear resistant material such as hardened tool steel, molybdenum, cast iron, or tungsten. The blade can be made from a material compatible to the powder being filled, for example, a tungsten blade is used for tungsten powder, and a molybdenum blade for molybdenum powder.

Dispersing bar 14 is fixedly attached, e.g., by fasteners, welding, or other suitable attachment, to square shaft 10 at a location spaced above blade 12 for dispersing particle agglomerations so that substantially unagglomerated powder particles are fed to blade 12. For example, dispersing bar 14 can be attached to shaft 10 so that the end of bar 14 closest to blade 12 is spaced about 1 inch above blade 12. Dispersing bar 14 is shown attached at an angle of about 45° to square shaft 10, and extends from the bar 14 to about the inside diameter of mold 30. Dispersing bar 14 can have any size or suitable attachment angle to fit within mold 30 and disperse particle agglomerations above the bar while being rotated by shaft 10. Preferably, dispersing bar 14 is made from a hardened wear resistant material as described above for blade 12.

A channel 22 extends axially through the center of a cylindrical chuck means 16, channel 22 having a sufficient diameter to permit shaft 10 to pass therethrough. Chuck means 16 is slideably mounted on shaft 10 for applying a rotating force in the direction of arrow 17 to shaft 10. Chuck means 16 is configured for applying force to the bearing surfaces of shaft 10 while at the same time permitting the movement of shaft 10 axially through chuck means 16. For example, cylindrical rollers 15 are conventionally attached, e.g., by fasteners or welding, attachment not shown, to chuck means 16 so that rollers 15 will be adjacent to, and in firm contact with oppositely facing bearing surfaces on square shaft 10. At the same time, rollers 15 are free to rotate in a direction tangential to the axis of the rollers, to permit movement of shaft 10 axially through channel 22 in chuck 16. Alternatively, chuck means 16 can have an axial channel having a square cross-section so that the cross-section of the channel is slightly larger than the cross-section of square shaft 10, and can apply force to the bearing surfaces on the shaft while permitting the axial movement of the shaft through the chuck means.

In the apparatus shown in FIG. 1, chuck means 16 is the shaft of motor 18. Motor 18 applies force to the chuck for rotating shaft 10, dispersing bar 14, and blade 12. Motor 18 can be a d.c. motor of about ¼ horsepower or greater turning at about 100 to 500 revolutions per minute. Motor 18 is fixedly attached to stand 24 by support bar 26. Stand 24 can be rotated for positioning motor 18 and shaft 10 away from mold 30 to permit removal of the powder filled mold. Other suitable means well known in the art can be used for turning chuck means 16, for example, chuck means 16 is supported above mold 30 by bearings. A turntable type drive assembly comprised of a d.c. motor and appropriate gears, wheels, belts, or chains can be used to rotate chuck means 16.

The weight of blade 12, dispersing bar 14, and shaft 10 provide a force that urges blade 12 to compact the powder below the blade. However, additional weight such as rod 20 can be added to shaft 10 to provide additional force for urging blade 12 to compact powder below blade 12, and achieve a higher fill density of the powder. Rod 20 can be made as various sizes and from various materials, such as nickel, steel, or tungsten to provide a desired force for urging blade 12 to compact powder below the blade. Rod 20 is located by a suitable attachment above chuck means 16 that permits various sized rods to be mounted on shaft 10, for example rod 20 is located in a bore drilled into shaft 10.

In operating powder filling apparatus 8, a vibrating powder feeder 28 supplies a continuous feed of powder particles 32, for example tungsten powder, into cylindrical mold 30. Tungsten powder does not flow freely and as a result accumulates in a powder bed above blade 12, with particle agglomerations 33 forming therein. Motor 18 turns at a rate between about 100 to 500 revolutions per minute rotating chuck means 16, square shaft 10, dispersing bar 14, and blade 12 in the direction of arrow 17 about the central axis of cylindrical mold 30. Dispersing bar 14 breaks up particle agglomerations 33 as it rotates, so that substantially un-agglomerated particles are fed to blade 12. The turning of shaft 10 also causes blade 12 to spread the powder particles evenly across the inside diameter of mold 30.

While spreading the powder particles evenly, the blade is also urging the particles to compact in a localized continuous fashion. This compaction is not sufficient to bond the particles together as occurs during subsequent isostatic pressing, rather it is compaction that provides a high fill density of the powder. The powder particles are compacted in a spiral path forcing the blade away from the forming fill compact 40 so that the blade retracts, essentially unscrewing itself out of powder bed 34 driving shaft 10 upward and through chuck 16. Because the compacting action of blade 12 operates only upon the localized spirally formed layer directly beneath the blade, the compaction force urging the particles to a high fill density is uniform from one end of the mold to the other and the mold is filled to a uniform fill density.

EXAMPLE I

A first tungsten powder compact was cold isostatically pressed from a urethane mold filled with tungsten powder by the method and apparatus of this invention, and a second tungsten powder compact was cold isostatically pressed from a mold manually filled with tungsten powder. The first compact was formed in a first urethane mold having an inside diameter of about 30 millimeters and a length of about 730 millimeters, and was filled with tungsten powder having an average particle size of about 3.5 microns. The mold was sealed at its lower end with a punch about 30.5 millimeters in diameter and 25 millimeters long.

The mold was first filled with the method and apparatus of this invention, the powder filling apparatus having a ¼ horsepower motor, a 6 mm. by 6 mm. by 900 millimeter square steel shaft, a 700 gram load attached to the square shaft, a steel dispersing bar of about 3 mm. by 36 millimeters at a 45 angle attached to the shaft, and two steel blades having a pitch of about 20 degrees attached to the bottom of the shaft. The weight of the blade, shaft, and dispersing bar was about 340 grams. The powder filling apparatus was placed into the urethane mold so that the shaft, dispersing bar, and blade extended into, and to the bottom of the mold. Tungsten powder was poured from a vibratory feeder at a rate of about 14 grams per second into the mold, and the shaft was rotated at a speed of 360 revolutions per minute, thereby filling the mold. The rotating blade urged the powder to compact beneath the blade so that the mold was filled with the tungsten powder to a density of about 6.8 grams per cubic centimeter. After removing the powder filling apparatus, the top punch was fitted on the mold, and the mold was dry bag cold isostatically pressed at about 25,000 pounds per square inch for 30 seconds. Pressure was released at a rate of about 0.7 Mpa per second, and the first compact removed from the mold. The mean diameter of the first compact was 23.9 millimeters.

A second compact was pressed in a second urethane mold having an inside diameter of about 34 millimeters. The tungsten powder was poured manually into the second urethane mold, and the same isostatic pressing conditions used to isostatically press the first compact were used on the second mold. After pressing, the second compact had a mean diameter of 23.9 millimeters.

Uniformity in fill density is directly related to improved uniformity in the diameter of the pressed cylindrical compact. Therefore, by measuring the diameter of each compact at various positions along its length, the uniformity of the fill density could be measured after pressing the compacts. The variation in the diameter of the first compact along its length was about plus or minus 0.4 millimeters. The variation in the diameter of the second compact along its length was about plus or minus 0.7 millimeters. Dry bag cold isostatically pressed molds filled by the method and apparatus of this invention produced compacts having improved uniformity in diameter. Inspection of the pressed compacts showed that flaring at the ends of the first compact was reduced by 33 percent as compared to flaring at the ends of the second compact.

What is claimed is:

1. A method for filling powder particles in a generally cylindrical mold having a generally uniform cross-section, comprising;

feeding the powder particles into the mold; and compacting the powder particles in spirally formed layers so that the particles are compacted continuously in localized adjacent areas.

2. The method of claim 1 further comprising the step of dispersing particle agglomerations in the powder so that substantially un-agglomerated particles are spirally formed into layers.

3. An apparatus for filling powder particles into a generally cylindrical mold of generally uniform cross-section, comprising:

blade means configured to direct powder particles to spread evenly in the mold and urge the powder particles to compact while the blade means is rotated about an axis, a shaft attached to the blade means for rotation of the blade means about the axis, the shaft having bearing surfaces for acceptance of force applied to the shaft, chuck means slideably mounted on the shaft through an axial channel, the chuck means being configured for applying force to the bearing surfaces on the shaft, while permitting movement of the shaft axially through the channel, and drive means connected to the chuck means for applying force to rotate the chuck means about the axis.

4. The apparatus of claim 3 further comprising a dispersing means attached to the shaft at a location spaced from the blade means for dispersing particle agglomerations while being rotated by the shaft, before the agglomerated particles come into contact with the blade means.

5. The apparatus of claim 3 further comprising a load means attached to the shaft for urging the blade means to compact the powder.

6. The apparatus of claim 3 wherein the chuck means is the shaft of a d.c. electric motor.

* * * * *